Figure 1:
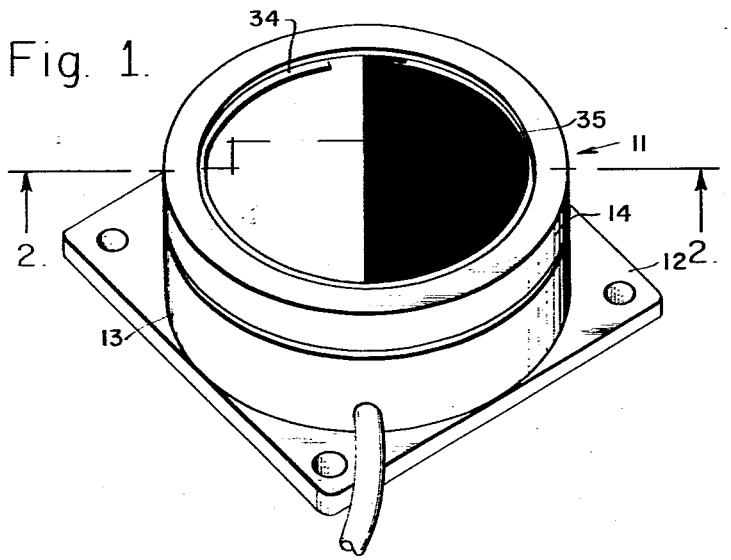

Nov. 28, 1967  R. P. CLIFFORD  3,355,589

CONSTANT SENSITIVITY DIFFERENTIAL RADIOMETER

Filed July 7, 1964  2 Sheets-Sheet 1

Richard P. Clifford,
INVENTOR.

BY.

E. Hayward Marshall

AGENT.

Nov. 28, 1967  R. P. CLIFFORD  3,355,589

CONSTANT SENSITIVITY DIFFERENTIAL RADIOMETER

Filed July 7, 1964  2 Sheets-Sheet 2

Richard P. Clifford,
INVENTOR.

BY

AGENT.

3,355,589
CONSTANT SENSITIVITY DIFFERENTIAL RADIOMETER
Richard P. Clifford, Tarzana, Calif., assignor to TRW Inc., a corporation of Ohio
Filed July 7, 1964, Ser. No. 380,860
2 Claims. (Cl. 250—83.3)

This invention relates to a differential radiometer and more particularly to a differential radiometer which utilizes the temperature difference generated between two equally exposed sensing portions, having high and low absorptance respectively, to provide an output signal proportional to the incident solar energy, and wherein the low absorptance, high emittance portion does not change its absorptance under prolonged exposure to ultraviolet radiation in a vacuum, and therefore the sensitivity is substantially constant over a prolonged period of use.

A differential radiometer is disclosed in the copending application of R. P. Clifford, Ser. No. 380,835, filed July 7, 1964, which utilizes physically identical and equally exposed black and white sensing surfaces. The temperature difference generated between the two surfaces as a consequence of the different radiant absorptances is detected and provides an output signal proportional to the incident flux. Thus the constancy of the instrument calibration depends on the constancy of the differential absorptance.

There is considerable difficulty in maintaining constant absorptance of the light surface, since the low absorptance, high emittance coatings which may be utilized, change their absorptance under prolonged exposure to ultraviolet radiation in a vacuum. Therefore, a change in the sensitivity of the radiometer will occur after continued use in the solar vacuum environment.

Briefly stated, one preferred embodiment of the differential radiometer of the present invention consists essentially of a massive cylindrical heat sink or body having two separate semicircular sheets of metal foil attached thereto along their circular edges. The circular quartz window covers the two semicircular sheets of meal foil, the upper surfaces of which are coated with flat black paint. The underside of one half of the quartz window is aluminized and also coated on the underside with flat black paint. This latter half of the quartz window covers one of the two metal foil sensors. The temperature at the center of curvature of each of the discs is sensed by means of a very small, thin, etched, nickel foil resistance thermometer element cemented to the rear or undersurface of each half disc or sensor.

Since the opaque half of the quartz window shields the half disc or sensor from incoming radiation while the clear half of the window transmits radiation to the other half disc or sensor, a temperature difference is established which provides an output signal by connecting the resistance elements as adjacent arms in a Wheatstone bridge circuit. A third resistance thermometer is cemented or otherwise attached to the body of the radiometer, so that its senses the body temperature, and is inserted in the bridge circuit to maintain the sensitivity of the radiometer constant in spite of changes in the overall bridge resistance due to changes in body temperature.

One object of the present invention is to proivde an improved differential radiometer, wherein the sensitivity will remain substantially constant over prolonged periods of use.

Another object of the present invention is to provide an improved differential radiometer, wherein the sensitivity or responsivity is substantially constant over a relatively wide range of operating temperatures.

Figure 2:
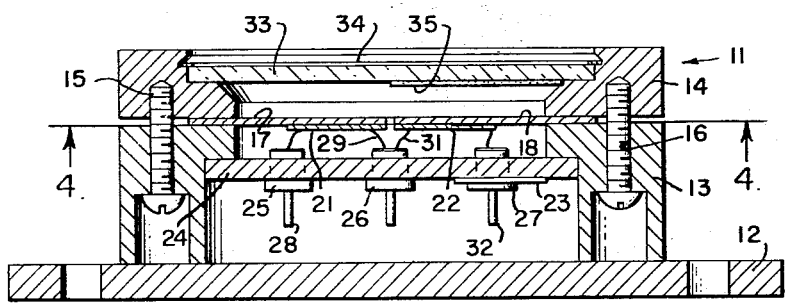
Figure 3:
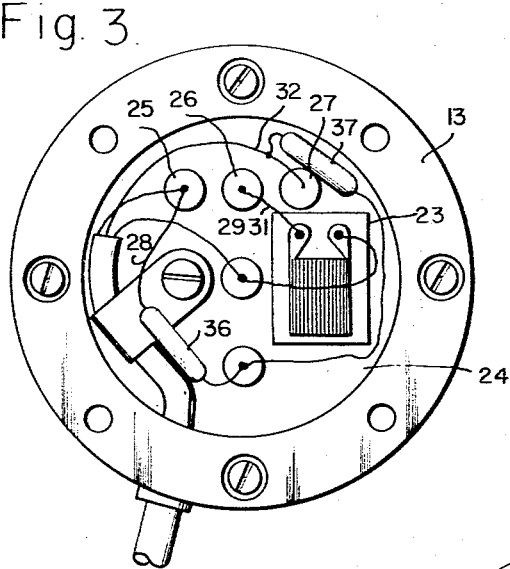
Figure 4:
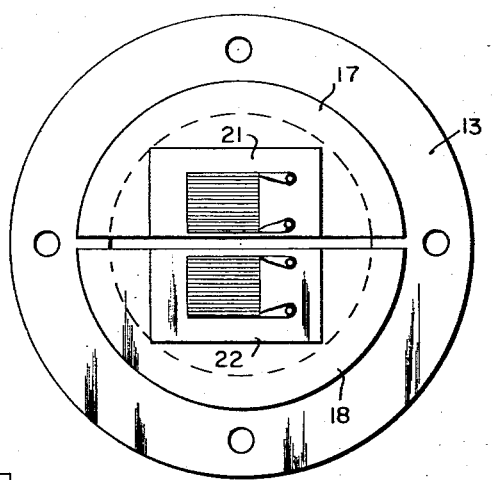
Figure 5:
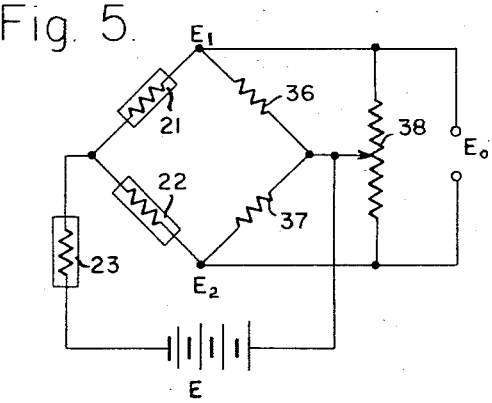

Other objects and many of the attendant advantages of this invention will be readily appreciated when the same becomes better understood by reference to the following detailed description when considered in connection with the accompanying drawings, wherein:

FIGURE 1 is a perspective view of one preferred embodiment of the present invention;
FIGURE 2 is a transverse sectional view taken along line 2—2 of FIGURE 1;
FIGURE 3 is a bottom view of the radiometer shown in FIGURES 1 and 2;
FIGURE 4 is a sectional view taken on the line 4—4 of FIGURE 2 and illustrating the arrangement of the resistance temperature gauges on the semicircular sheets of metal foil which are shown attached to the clamp ring; and
FIGURE 5 is a schematic illustrating one preferred form of the compensating bridge circuit which provides an output signal indicating the amount of incident solar energy on the radiometer.

Referring now to the drawings in detail and more particularly to FIGURES 1 and 2, the differential radiometer of the present invention consists of a rectangular base plate 12 on which a cylindrical body 13 is mounted.

A clamp ring 14 is secured to the body 13 by means of studs 15 and 16 or other conventional securing means and clamps the two circular half discs 17 and 18 in position.

The two semicircular sheets of metal foil which form the radiometer half discs 17 and 18 are preferably formed of silver, aluminum or some other thin sheet metal which has a high thermal conductivity, so that when the radiation strikes the foil surface, heat is conducted radially from the center of the foil half disc to the cooler edge attached to the body 13 and the clamp ring 14, which form a relatively massive heat sink which stays at ambient temperature depending upon its environment.

The two half discs 17 and 18 are provided with resistive temperature gauges or transducers 21 and 22 which are secured thereto by some suitable means such as cement.

The temperature gauges are preferably a thin, etched, nickel foil, resistance thermometer element, which may be cemented to the rear surface of a half disc 17 and 18, as near to the center as possible. However, other temperature measuring devices, such as thermocouples and thermistors can be utilized, however, they are less accurate and may be hard to match.

Another temperature gauge 23 preferably similar to those shown at 21 and 22, is secured to the underside of the mounting plate 24 which is attached to the back or underside of the body 13. The purpose of this additional gauge is for compensation of the bridge network and will be described in more detail subsequently in conjunction with FIGURE 5.

The Teflon feed-throughs or insulators 25, 26 and 27 are also inserted in the mounting disc 24, and the wires 28, 29, 31 and 32 from the temperature gauges 21 and 22 extend therethrough for connection to the components illustrated in the back view of FIGURE 3, and to the external circuit.

A quartz window 33 is secured in a circular recess in the clamp ring 14 by a snap ring 34. One half of the underside of the quartz window 33 is provided with an aluminum coating 35 which is preferably evaporated on the surface. The underside of the aluminized half of the quartz window 33 is also coated with flat black paint.

The upper surfaces of the half discs 21 and 22 are also coated with flat black paint, and the window is then positioned so that the aluminized half covers a portion of the sensor which is chosen as the cold half having a low absorptivity, whereas the other half disc 21 in FIGURE 2 would be the hot side or the side having a high absorptivity for solar energy.

As shown in FIGURE 3, the wires 28, 29, 30 and 31 are connected to the resistors 36 and 37, and also to the third temperature gauge 23 which is mounted on the mounting disc 24 to form the compensating bridge circuit illustrated in FIGURE 5.

The arrangement of the temperature gauges 21 and 22 centrally secured to the metal foil half discs 17 and 18 is more clearly shown in the sectional view of FIGURE 4 looking at the bottom surfaces of the half discs 17 and 18.

*Operation*

The differential radiometer disclosed in the copending application identified above, utilizes physically identical and equally exposed black and white sensing surfaces. The temperature difference generated between the two sensing surfaces as a consequence of the different radiant absorptances is detected and provides the output proportional to the incident flux. Thus the constancy of the instrument calibration depends on the constancy of the differential absorptances. A problem exists in maintaining constant absorption of the white surfaces, since all low absorptance, high emittance coatings which are applicable for this purpose, suffer a change in absorptance under prolonged exposure to ultraviolet radiation in a vacuum. A change in the sensitivity of the radiometer can therefore be expected after continued use in the solar vacuum environment.

One of the important features of the differential radiometer identified above, is the almost identical thermal coupling of the two sensing surfaces with the instrument window, which contributes significantly to its stability. Changes in window temperature affect both surfaces equally and the effects are cancelled by the differential principle of operation.

The present invention substantially eliminates the problem of absorptance degradation of the white surface and yet retains the advantage of equal thermal coupling of both sensing surfaces to the instrument's window. By painting the underside of the aluminized half of the quartz window 33 black, the emittance of both halves of the window underside are matched. Thus, the effects of window temperature on each of the sensor halves 21 and 22 are matched. Radiation passes once through the clear half and twice through the opaque half due to the reflection back out from the aluminized second surface 35. The slight difference in temperature between the window halves, which is generated as a consequence of this difference in absorption path lengths, does not substantially affect the stability or performance of the instrument.

Actually, the present invention shows an improvement in sensitivity which is achieved due to the greater temperature difference between the two sensor halves, since the effective frontal absorptance of the aluminized half of the window is lower than in the previous arrangement with one half disc painted white.

The differential radiometer operates by experiencing a difference in the temperature of the two half disc sensing areas. The temperatures of the half discs are detected by means of resistive transducers made of a material with a high thermal coefficient of resistivity. These gauges are attached to the underside of the half discs at their geometrical center. The gauges are electrically connected as the adjacent arms of a conventional Wheatstone bridge as shown in FIGURE 5 so that an increase in the resistance of one gauge relative to the resistance of the other results in an unbalanced condition of the bridge.

Prior to the radiometer being exposed to thermal radiation, the bridge is balanced by means of the potentiometer 38. When radiation strikes the radiometer the temperature of the exposed half disc 17 increases over that of the shaded half disc 18 causing the resistance gauge 21 attached to half disc 17 to increase its resistance relative to the gauge 22 attached to half disc 17. This difference in resistance causes an electrical unbalance of the bridge, so that the potential at $E_1$ is different from that at $E_2$. The difference in potential between $E_1$ and $E_2$, which is proportional to the difference in the resistance (or temperature) between gauges 21 and 22, or the potential $E_0$ may be detected by a high impedance voltmeter or recorder circuit (not shown).

Inasmuch as the resistance of the temperature gauges 21 and 22, which form the active arms of the bridge, changes with temperature, the effective resistance of the bridge changes over the range of the radiometer operating temperatures. The sensitivity or responsivity of the radiometer changes with the effective resistance of the bridge, therefore means must be provided to keep the sensitivity of the radiometer constant in spite of changes in the overall bridge resistance. A series compensation resistance 23 with a positive thermal coefficient of resistance is inserted in the bridge power circuit. This compensation resistance 23 is atttached to the body of the radiometer or to the mounting disc 24 which is in thermally conductive contact with body 13 and forms a part thereof, so that it senses the body temperature of the instrument. The sensitivity of the radiometer 11 increases as its operating temperature increases; the resistance of the series compensation resistor also increases as its temperature increases, thereby reducing the current through the bridge with increasing temperature and thereby reducing the sensitivity of the radiometer. By proper choice of resistance and material, the compensator is made to counteract the increasing sensitivity of the radiometer bridge circuit with increasing temperature.

The differential radiometer of the present invention is particularly suitable for such applications as intensity calibration of solar simulators and in-chamber flux monitoring during solar/vacuum tests, since the radiometer is essentially insensitive to the surrounding thermal environment.

The response of the radiometer is relatively rapid, so that a large irradiated target area may be mapped in short periods by means of a continuously moving or traversing fixture. Traversing speeds of one inch per second can be utilized without loss of significant intensity detail over areas of one square inch.

Any number of radiometers may be connected to a single readout channel to obtain an accurate, instantaneous, mean flux density reading from representative points on a target.

The spectral response of the radiometer is substantially constant throughout the range of 0.27 to 2.8 microns with the quartz window, since it is intended to be used with simulated solar sources which utilize quartz or glass optics. However, with suitable modification, the radiometer of the present invention could be utilized for other kinds of radiation by using different windows and coatings, etc. The stability of the differential radiometer of the present invention is such that the reading error is less than 0.015 solar constant over a 300° F. range of operating temperatures. Outside of this operating range, the error is still very small, but in applications where extreme accuracy is desired and where the anticipated temperature range may exceed the 300° F. range, the radiometer may be mounted in a simple thermostated plate, wherein the temperature can be controlled within ±75° F. of the median temperature.

Obviously, many other modifications and variations of the present invention may be made within the scope of the following claims.

The embodiments of the invention in which an exclusive property or privilege is claimed are defined as follows:

1. A differential radiometer comprising:
   (A) a cylindrical body having an axial opening in one end thereof for admitting radiation;

(B) a pair of thin metallic sensors positioned across said opening with their peripheral edges contacting said body, each of said sensors being coated with a material having high absorptance and high emissivity;
(C) separate means for resistively sensing the temperature positioned adjacent the center of said opening on each of said sensors;
(D) a window positioned in said opening before said sensors,
a portion of said window in front of one of said sensors having a highly reflective coating and a high emissivity coating facing said one sensor;
(E) electric circuit means connected to said temperature sensing means for providing an output signal proportional to the incident radiation;
said circuit means including a third means for resistively sensing the temperature attached to said body to compensate for variations in the body temperature.

2. A differential radiometer comprising:
(A) a relatively massive hollow cylindrical body having an axial opening in one end thereof for admitting radiation;
(B) a pair of thin metallic half discs positioned across said opening with their peripheral edges contacting said body,
each of said half discs being coated with a material having high absorptance and high emissivity;
(C) separate means for resistively sensing the temperature positioned adjacent the center of curvature on each of said half discs;
(D) a quartz window positioned in said opening before said half discs,
a portion of said window in front of one half disc having a highly reflective coating and a high emissivity coating facing said one half disc;
(E) electric circuit means connected to said temperature sensing means for providing an output signal proportional to the temperature difference, said circuit including another means for resistively sensing temperature attached to said body for ambient temperature compensation.

References Cited

UNITED STATES PATENTS

| | | | |
|---|---|---|---|
| 2,865,202 | 12/1958 | Bennett | 73—355 |
| 3,010,102 | 11/1961 | Ketchledge et al. | 250—83.3 |
| 3,069,546 | 12/1962 | Buntenbach | 250—83.3 |
| 3,232,113 | 2/1966 | Malone | 73—355 |
| 3,255,632 | 6/1966 | Brooks | 73—355 |

RALPH G. NILSON, *Primary Examiner.*

S. ELBAUM, *Assistant Examiner.*